S. MALES.
PUBLIC URINAL.

No. 102,416.            Patented Apr. 26, 1870.

Attest
Wm Jones
Thomas Smith

Inventor.
Saml Males
By Knight Bros
Attys

N. PETERS, Photo-Lithographer, Washington, D. C.

2 Sheets—Sheet 2.
S. MALES.
PUBLIC URINAL.
No. 102,416.                    Patented Apr. 26, 1870.
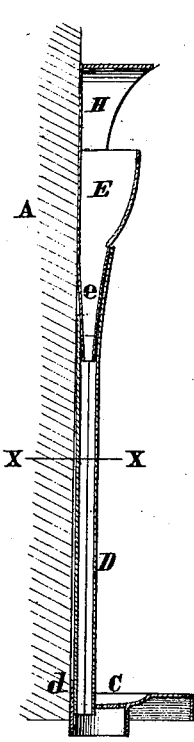
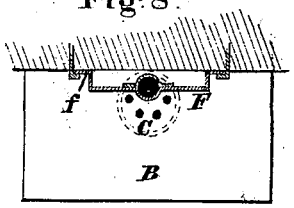
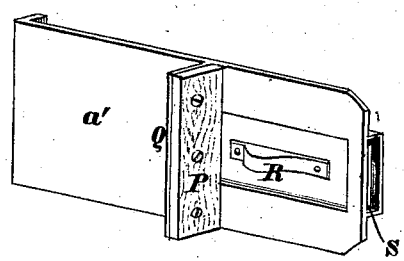
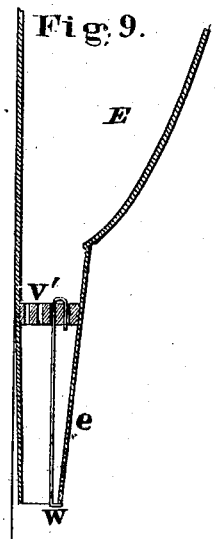
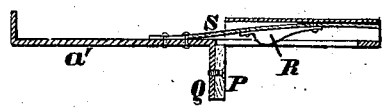
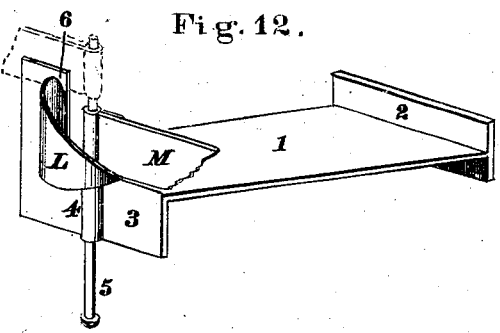
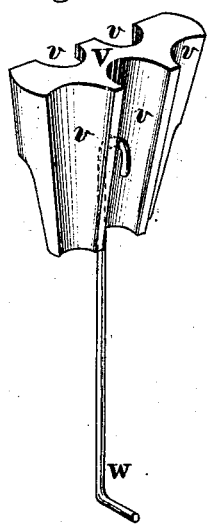
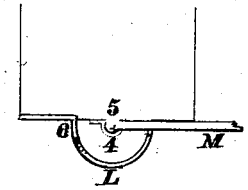
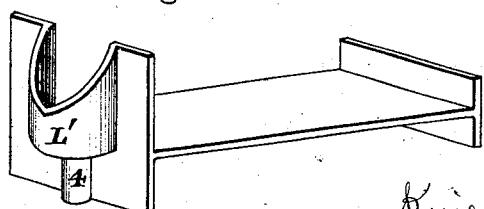
Attest
Mrs Jones
Thomas Smith
Knight Bros.
Attys for Male
N. PETERS, Photo-Lithographer, Washington, D. C.

United States Patent Office.

SAMUEL MALES, OF CINCINNATI, OHIO.

Letters Patent No. 102,416, dated April 26, 1870.

IMPROVEMENT IN PUBLIC URINALS

The Schedule referred to in these Letters Patent and making part of the same.

*To all whom it may concern:*

Be it known that I, SAMUEL MALES, of Cincinnati, Hamilton county, State of Ohio, have invented certain new and useful Improvements in Public Urinals and Privies, of which the following is a specification.

Nature and Objects of Invention.

My invention consists of certain improvements upon the public urinal and necessary, patented by me January 28, 1868.

General Description with Reference to Drawings.

Figure 7 is a vertical front-to-rear section of my urinal-pot or bowl and its accessories.

Figure 8 is a horizontal section of the same at the line X X.

Figure 9 is a vertical front-to-rear section of the pot or bowl.

Figure 10 shows, in perspective, my catch-anchor, with wood or rubber pad and yielding spring-catch attached.

Figure 11 is a horizontal section of the same anchor, with its spring catch retracted.

Figures 12 and 13 are a perspective and top view, respectively, of a form of gravitating hinge for a door, designed to move through one-half of a circle.

Figure 14 is a perspective view of my double gravitating hinge, designed for doors, capable of being moved through one-fourth of a circle only.

Figure 15 is a perspective view, showing the preferred form of my strainer.

A represents a portion of a house.

B is a raised foot-plate or step, which may be of cast-iron, and which is provided with a sink or perforated depression, C, to conduct into a suitable drain or sewer the misdirected urine, a larger orifice being provided in the rear portion of the sink for the lower extremity of the pipe D that conducts from the pot E, the pipe and sink snugly uniting in one funnel-shaped pipe which leads to sewer.

Figure 5:
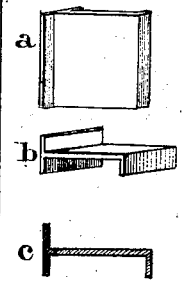
Figure 5 shows, in different positions, my anchor for connecting the urinal to the wall.

F is a shield of cast or sheet metal, having flanges *f f*, which enable it to be secured to the wall by means of anchor *a b c*, shown in fig. 5.

The pipe D is formed in one piece with the shield, and terminates at the top in a funnel shape, which receives and surrounds the discharge-pipe or neck *e* of pot E.

The lower end of the shield F overlaps a lip, *d*, on the foot-plate B C, so as to hold said plate in place. There being no screw-connections for these devices, much expense and labor is saved.

The nozzle *e* of the pot or bowl E has the represented funnel form to receive and retain a corresponding tapering strainer, V, fig. 15, whose prolonged form enables it to readily find its place in said nozzle, and to be as readily removed whenever it may be desired to cleanse the pot or discharge-pipe.

This mode of putting in the strainer is preferable, as the nozzle can be enameled inside as well as outside, and anchoring the strainer in by means of anchor W will obviate the objections made to the use of screws, owing to their liability to rust in use.

The strainer V is formed with the passages for the fluid on the outside of the casting, as shown, in order that when removed it may be readily cleaned.

The above-described devices for connecting the shield, pot, and sink together supersedes the necessity of the screw-attachments, which are known to be objectionable on account of their liability to rust fast in use, and their first cost and expense in erection.

Overhanging the pot E is a hood or projection, H, covering the top of the pot, and so near the pot and with such forward protuberance as to prevent the introduction of any part of the person for improper use of the pot. The opening is in the side only, as shown. This hood may be cast in one piece with the pot.

The pot E is secured to the wall by anchors such as that shown in different aspects at *a b c*, fig. 5.

Figure 1:
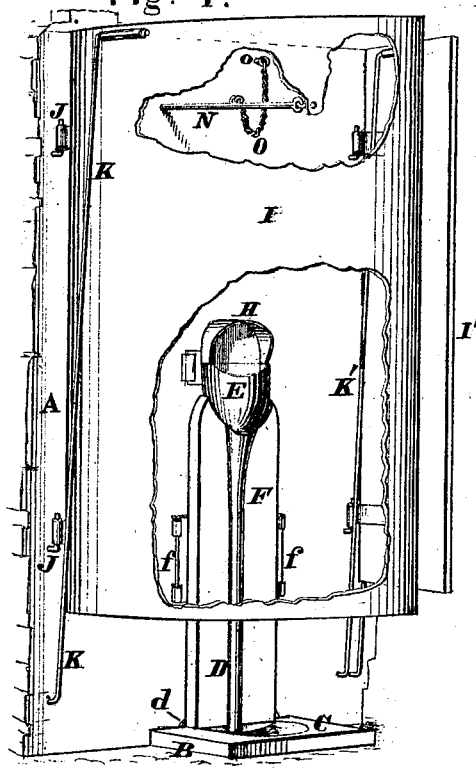
Figure 1 is a perspective view of a public urinal embodying my invention, the same being provided with a single curved door or projecting shield here shown open, and with a yielding self-adjusting screen.

One of the most important of these improvements upon my patent of January 28, 1868, is that of the curved shield shown in fig. 1.

This consists of an outwardly-curved or bayed door, I, which hinges to the wall, as at J, at one side, with gravitating hinges or springs to compel it to close automatically, and so constructed that, when closed, it will entirely and very compactly inclose and protect the urinal proper without presenting any sharp corners or angles to be caught against by passing vehicles. When closed it is held by a spring catch, shown in figs. 10 and 11, in such a way that it cannot be slammed by the wind, though, when closed, the door will project but little from the wall, say not to exceed, of necessity, seven inches. It will, when open, sufficiently screen the occupant from public view.

The said door may be caused to close automatically by a spring, K, or by being hung on gravitating hinges or eyes such as shown in figs. 12 and 13, where L represents a helical flange on which the hinge-plate M of the door rests, and down which, when left at liberty, it gravitates against the wall or pad, where it is automatically fastened by a spring catch, hereinafter described, for holding the door, so that it cannot be slammed by the wind, and can be readily opened by a slight pull of the operator.

N is a stay or prop, of sufficient length to hold the door open when occupied, one end of the stay being secured by staple to the door, and said stay being further loosely suspended from a point at or near its mid-length by a chain, O, and staple, o, fastened to the wall. The act of opening the door elevates this stay so as to indicate its use, and the occupant has merely to support the end of the stay until it is propped against the wall by the partially shutting of the door, when he need give no further attention.

The door, upon the operator leaving the closet, causes the stay to drop without again touching the wall or marring its surface.

My preferred forms of gravitating hinges are shown in figs. 12, 13, and 14, 1 being the anchor-plate adapted to rest upon the brick-work, 2 being its rear lip which engages behind the first course of bricks, and 3 being its front lip which grasps the outer face of the wall.

L or L' is a single or double helical flange, on which the door-hinge rests and slides.

The orifice 4 in said anchor is for the pintle 5 to fit into and slide vertically, the pintle being, as shown, rigidly attached to the hinge M of the door.

A notch, 6, may be provided at the summit of the flange to retain the door in a position at right angles to that to which it gravitates.

It will be seen that the peculiar device exhibited in figs. 12, 13, and 14 is formed in one piece, and yet embodies three important features, viz, a secure connection for the door to the wall in the form of the anchor-plate 1 2 3; an eye, 4, for the reception of the hinge of the door; and a single or double helical flange, L or L', for compelling the door to close automatically by gravitation.

In figs. 13 and 14 the helical flange takes double form, right and left from the center, in order that the screen I, (for which this double form is specially designed,) with its common strap, hinge, and pintle, when hung, will gravitate to the centre, setting the screen at right angles with the wall to screen the occupant from view of passers by.

When force is brought against the screen, such as the forcible contact of a load nearly filling the alley, the hinge will raise on the helical flange, folding the screen against the wall and allowing the load to pass without injury to the screen. When relieved, it will gravitate back, by reason of the helical flanges, to the central position at right angles to the wall.

The edge of the door I, shown in fig. 1, impinges upon the pad or cushion P, figs. 10 and 11, when shut.

This pad is composed of wood, leather, rubber, or other suitable material, and is fastened to the lip Q, upon an anchor-plate, a', which anchor-plate may project in front of the wall, and have in its projecting portion a catch, R, which is pressed outward by a spring, S, as in fig. 10, except when yielding to the passing edge of the door in opening or closing of the same, (see fig. 11.)

Figure 2:
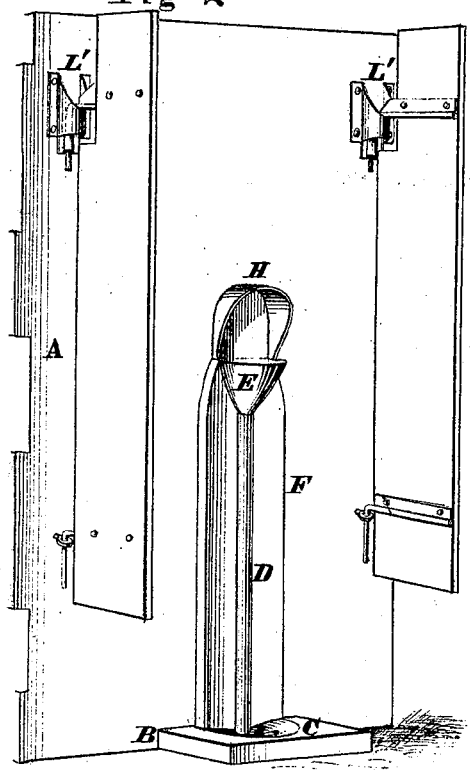
Figure 2 shows a similar urinal without doors, but provided with a pair of yielding self-adjusting screens only.

Hinged to the wall of the urinal, shown in fig. 1, on the opposite side to that occupied by the door I, may be a screen, I', which may be held to the represented rectangular projecting position by springs, or by hanging the screen on center gravitating hinges, such as represented by L', fig. 2.

The object of using the screen I' in connection with the single door I, as in fig. 1, is for the purpose of protecting the occupant from public view from the side on which the door opens, in cases where the exigencies of the case demand it, as, for instance, in courts or wide alleys.

Figure 3:
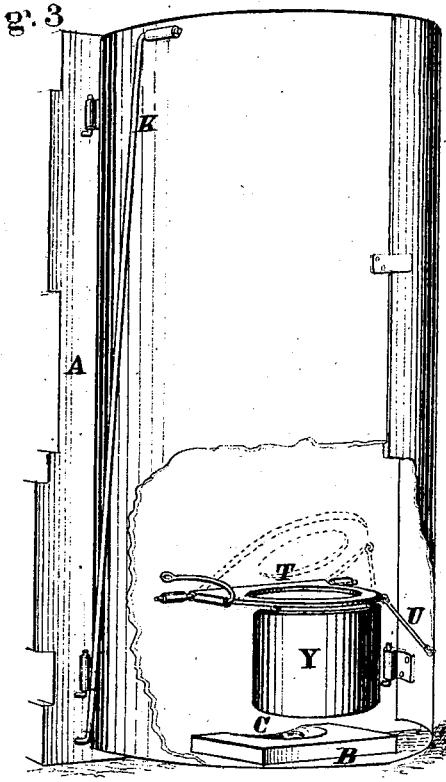
Figure 3 shows a urinal for female use, provided with suitable seat operated by the door.
Figure 4:
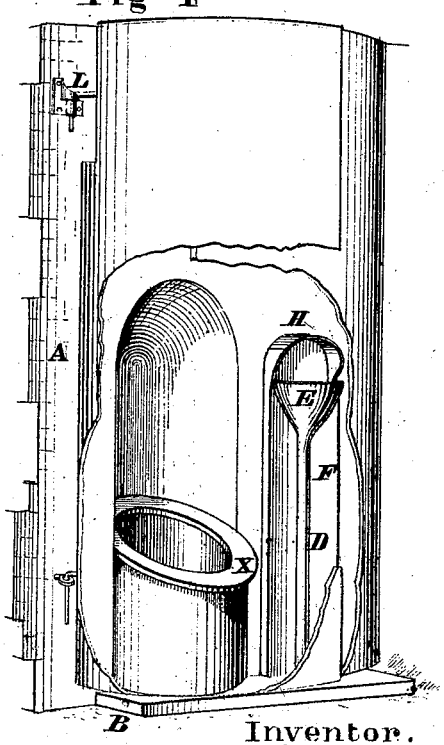
Figure 4 shows a privy and urinal combined, with a recess in the wall to save room.

Instead of a door and screen, as above described, I may use two screens, as in fig. 2, and omit the curved door, or I may use two curved folding doors, as in figs. 3 and 4, or a single curved door, as in fig. 1, without the screen.

The outcurved or externally-convex form of the door I, fig. 1, enables it to completely inclose the urinal in the most compact manner, and yet be connected to the wall on both sides, when shut, in the manner before explained. It also affords great strength with comparatively moderate expenditure of material.

While preferring the represented concavo-convex form of the door, I do not confine myself thereto, because the semi-hexagon or other bayed form may be employed.

Figure 6:
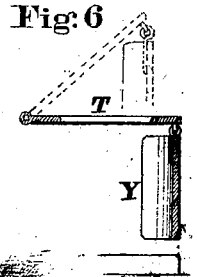
Figure 6 is a vertical front-to-rear section of the seat for female use.

For the use of females, I employ a seat, T, hinged to the wall and linked to one of the doors by rod or shackle U, so that the act of opening the door shall serve to depress the seat to its effective position, and also to hold the door open while the seat is in use without additional trouble to the occupant, (see strong lines in figs. 3 and 6;) while, on the other hand, the act of closing the door shall operate to fold the said seat upward, and to hold it in position shown by dotted lines in said figures.

Loosely hinged to and depending from the front edge of the seat T is an apron, Y, which serves to protect the clothes and person of the user from wetting. This device for operating the seat and holding the door in position when the urinal or privy is occupied may be applied to other privies and urinals having single or double doors, and where no seat is required the doors may be held open in the same manner. In fig. 4 a privy-seat is shown in company with a urinal-pot.

The anchor a b c is applied by removing a brick temporarily from the wall of the building and engaging the front lip of the anchor over the flange of the shield or other member to be made fast, and its rear lip or lips behind the first course of bricks.

The brick or half brick is then returned to its place in the wall, and is secured there by a suitable cement or mortar. This makes a very secure fastening with no defacement of the wall, and is much more durable than the usual mode of fastening by screws and wooden pegs.

The shield F effectually protects the wall from misdirected urine, which is at present so great a nuisance and injury to the walls of city buildings adjoining alleys and court-ways, and the pipe and shield being formed in one piece, as shown in figs. 7 and 8, makes a very neat and cheap conductor for the urine to the sink.

The strainer may be secured against removal by mischievous persons by the hook or anchor W, but this appliance is not necessary for retaining the strainer in place except against willful depredators.

The pot-nozzle being enameled inside as well as outside, the casting V is not liable to be rusted in with use, and can be separated without detaching the pot.

In X, fig. 4, is represented a recess in the wall to afford additional room where privies or water-closets are designed to be placed in alleys or court-ways. It will be seen that the sink in the foot-plate enables the apparatus to be used by boys who are unable, from their stature, to reach the pot.

The strainer in the sink C is cast separate, so that it can be replaced when worn out. While I prefer my described form of funnel-shaped discharge-pipe and tapering strainer, with outside depressions U, I do not desire to confine myself to it, as a parallel shape with holes may answer the same purpose.

Claims.

I claim—

1. The urinal-bowl E, when constructed with an overhanging hood, H, covering the top of the pot, with the opening in front, substantially as and for the purpose specified.

2. The pot E, provided with funnel-shaped nozzle or discharge-pipe e to receive the strainer V, substantially as and for the purpose set forth.

3. The peculiarly-constructed shield F and pipe D, fitted to the pot E and sink C, substantially in the manner and for the purpose described.

4. The strainer V, formed with depressions U for the passage of fluid, and fitted with anchor W to connect the strainer to the pot E, as and for the purpose specified.

5. The described combination and arrangement of the pot E e, shield F, pipe D, and the sink and foot-plate B C, constructed, combined, and arranged substantially as and for the purpose described.

6. A urinal fitted with yielding and self-adjusting screens I' I', fig. 2, so arranged as to hide the occupant from view on either side, substantially as described.

7. The hinged seat T and shackle U, constructed and arranged for the use of water-closets and urinals, substantially in the manner and for the purpose specified.

8. The pendent folding apron Y, loosely attached to the hinged seat T, substantially as described and for the purpose specified.

9. The gravitating anchor hinge-plate, figs. 12, 13, 14, embodying the anchor 1 2 3, the eye 4, with orifice to receive pintle 5, and the single or double helical flange L or L', substantially as and for the purpose specified.

10. In the described connection with a public urinal or privy, the single bayed or curved door I, when so constructed that in the shut condition it will entirely inclose the urinal-bowl, and provided, on one side, with spring or gravitating hinges for automatic closing, and at the opposite side with a yielding spring catch, R S, arranged and operating substantially in the manner and for the purpose described.

11. In combination with the devices embodied in the preceding clause, the door or shield I', fig. 1, arranged and operating substantially as and for the purpose described.

12. The anchor-plate a' Q, fitted with pad P and yielding spring catch R S, as and for the purpose stated.

13. In the described combination with the devices embodied in the tenth clause of claims, the prop N and the chain O, operating in the manner and for the purpose specified.

14. The step B, concave and perforated at C with a large hole to admit pipe D, and having an ascending lip, d, in the rear, all as shown and described.

In testimony of which invention I hereunto set my hand.

SAMUEL MALES.

Witnesses:
 FRANK MILLWARD,
 R. T. BRADLEY.